United States Patent [19]

Honjoh et al.

[11] Patent Number: 4,612,899
[45] Date of Patent: Sep. 23, 1986

[54] IGNITION TIMING CONTROL APPARATUS

[75] Inventors: Yoshihisa Honjoh, Kako; Hiroshi Okuda, Himeji, both of Japan

[73] Assignee: Mitsubishi Denki Kabushiki Kaisha, Tokyo, Japan

[21] Appl. No.: 694,967

[22] Filed: Jan. 25, 1985

[30] Foreign Application Priority Data

Jan. 31, 1984 [JP] Japan .................................. 59-16247
Jan. 31, 1984 [JP] Japan .................................. 59-16248

[51] Int. Cl.$^4$ .............................................. F02P 5/02
[52] U.S. Cl. .................................... 123/413; 123/418; 123/602
[58] Field of Search ............... 123/413, 418, 602, 612, 123/625

[56] References Cited

U.S. PATENT DOCUMENTS

| | | | |
|---|---|---|---|
| 3,721,223 | 3/1973 | Randau et al. ...................... | 123/413 |
| 4,244,336 | 1/1981 | Fitzner . | |
| 4,506,643 | 3/1985 | Krappel et al. ...................... | 123/418 |
| 4,528,970 | 7/1985 | Fujimoto ............................. | 123/602 |

FOREIGN PATENT DOCUMENTS

| | | | |
|---|---|---|---|
| 27412 | 6/1981 | Japan . | |
| 115854 | 9/1981 | Japan .................................. | 123/413 |
| 115856 | 9/1981 | Japan .................................. | 123/418 |
| 65972 | 4/1983 | Japan . | |
| 180385 | 12/1983 | Japan . | |

Primary Examiner—Tony M. Argenbright
Attorney, Agent, or Firm—Leydig, Voit & Mayer, Ltd.

[57] ABSTRACT

An ignition timing control apparatus for an internal combustion engine such as an outboard motor is disclosed. The ignition timing control apparatus has a throttle switch, interlocked with a throttle valve, including a first contact closed when the throttle valve is fully opened and a second contact closed when the throttle valve is fully closed. In the former case, the ignition timing of the engine is retained in an advanced angle, thereby enhancing the acceleration while in the latter case, the ignition timing is retained in a retarded angle, thereby enhancing the deceleration. When the first and second contacts are both opened, the ignition timing is advanced corresponding to the engine speed.

16 Claims, 13 Drawing Figures

IGNITION TIMING CONTROL APPARATUS

BACKGROUND OF THE INVENTION

This invention relates to an ignition timing control system for an internal combustion engine such as an outboard engine, and in particular to an ignition timing control apparatus which improves the decceleration, starting acceleration, and idling stability of the engine.

In outboard motors, etc., the ignition timing of the engine during starting is set at 5° Before Top Dead Center (hereinafter abbreviated as BTDC) to ensure starting, and during idling the ignition timing is set at 5° After Top Dead Center (hereinafter abbreviated as ATDC) to stabilize the revolutions of the engine at low engine speeds. When accelerating the throttle valve of the engine is opened while at the same time the ignition timing is advanced to 25°-30° BTDC to enhance the acceleration. However, since it is extremely complicated to provide the above operations by means of an automatic advance angle mechanism, a typical ignition timing control apparatus has freely rotatably disposed therein the stator of an ignition signal generator which is interlocked with the throttle lever of the engine by means of a ball joint with the direction of the axis of the rotatable rotor being fixed, resulting in a relatively complicated structure. Therefore, in the case where the ignition signal generator is freely rotatably disposed, a mechanism portion mainly formed of a bearing portion, a sustaining member for fixing the stator in the axial direction, and the ball joint interconnected with the throttle lever are easily worn and may break due to the vibration of the engine.

While an ignition timing control apparatus with the ignition angle advanced corresponding to the engine speed according to the output of the ignition signal generator has also been used, the startability of the engine and the stability during idling in this apparatus have not been improved yet.

Furthermore, the ignition timing control apparatus disclosed in U.S. Pat. No. 4,244,336, uses a method of advancing the ignition angle in the shape of a mountain in the low speed region. However, this method is inferior in the startability and acceleration although stability during idling is good.

As other prior art, there have been proposed Japanese Utility Model Application Laid-open No. 58-180385 published on Dec. 2, 1983, entitled "Electronic Advance Angle Ignition Apparatus" by Hitachi Works Co., Ltd. which discloses advancing the ignition timing of an engine by changing the activation level of an ignition timing control circuit according to the condition of an idle switch; Japanese Utility Model Application Laid-open No. 56-27412 published on June 30, 1981, entitled "Contactless Ignition Apparatus" by Nippon Denso Co., Ltd. which discloses the provision of a switch turned on during high speed deceleration of the engine and retarding the ignition timing by shortcircuiting an advancing ignition signal when the switch is on; and, Japanese Patent Application Laid-open No. 58-65972 published on Apr. 19, 1983, entitled "Ignition Apparatus for internal Combustion Engine of Outboard Motor" by Hitachi Works Co., Ltd. which discloses the provision of a switch interlocked with the throttle valve of an engine and advancing the ignition timing when the opening of the throttle valve reaches a predetermined degree.

SUMMARY OF THE INVENTION

It is accordingly an object of the invention to provide an ignition timing control apparatus which improves the acceleration and deceleration of an engine.

It is another object of the invention to provide an ignition timing control apparatus high in durability and reliability.

It is still another object of the invention to provide an ignition timing control apparatus which extends the speed range in which the engine operates stably.

In order to accomplish these objects, this invention comprises an ignition power source for generating a voltage corresponding to the revolutions of an engine and providing power necessary for the ignition of the engine; a switching element for connecting or disconnecting the power from the ignition power source to the ignition coil of the engine at a predetermined time; signal generator means for generating signals for setting an ignition timing corresponding to the engine speed; an ignition timing control circuit for computing the ignition timing on the basis of the signal from the signal generator means to provide an ignition signal to the switching element; and, a throttle switch interlocked with the throttle valve of the engine and having a first contact closed when the throttle valve is fully opened and a second contact closed when the throttle valve is fully closed.

When the throttle switch closes the first contact, the ignition timing provided by the ignition timing control circuit is retained in the advanced angle condition, when the throttle switch closes the second contact, the ignition timing provided by the ignition timing control circuit is retained in the retarded angle condition, and when the first and second contacts of the throttle switch are both opened in a middle engine speed, the ignition timing is advanced corresponding to the engine speed. The throttle switch may change a reference voltage of the ignition timing control circuit according to the operation of the throttle switch.

The ignition timing control circuit comprises a first circuit for applying a retarding signal as a first ignition signal from among the positive and negative signals from the signal generator means to the switching element, a second circuit for calculating the ignition timing on the basis of an advancing signal from among the positive and negative signals from the signal generator means and for generating a second ignition signal at an advanced timing when the throttle switch closes the first contact, at a retarded timing when the throttle switch closes the second contact, or at a timing corresponding to the revolutions of the engine when the first and second contacts are both opened in a middle engine speed, and a third circuit for generating a third ignition signal which is retarded behind the first ignition signal on the basis of an advancing signal from among the positive and negative signals from the signal generator means.

This ignition timing control apparatus may further comprise an engine operating condition detector means for providing as an output therefrom a predetermined signal when a predetermined time interval has lapsed after the start of the engine, and an interruption means for interrupting the first ignition signal for the switching element when the predetermined signal is provided as an output from the engine operating condition detector means.

BRIEF DESCRIPTION OF THE DRAWINGS

Throughout the figures, the same reference numerals indicate identical or corresponding portions.

DESCRIPTION OF THE PREFERRED EMBODIMENTS

Figure 1:
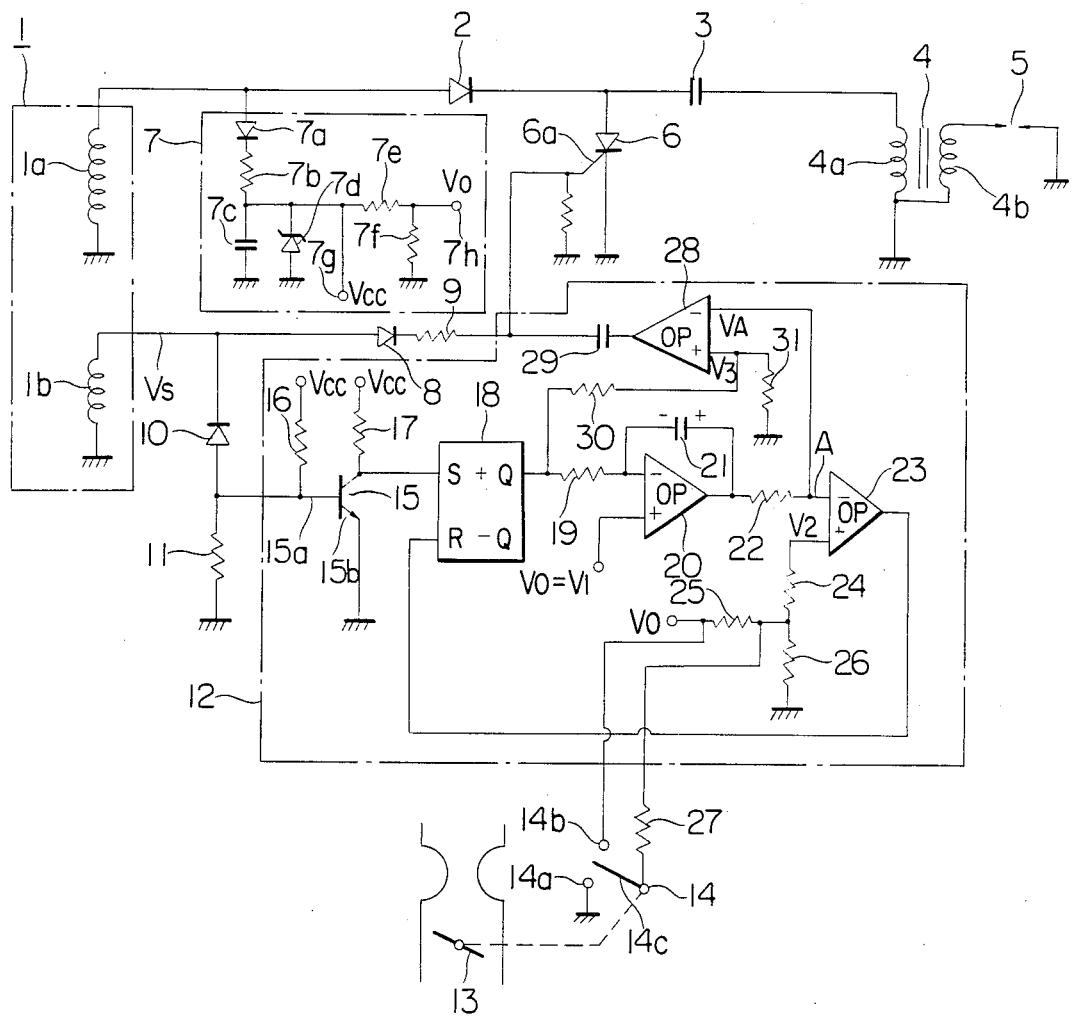
FIG. 1 shows a circuit diagram of an ignition timing control apparatus according to a first embodiment of this invention.
Figure 2:
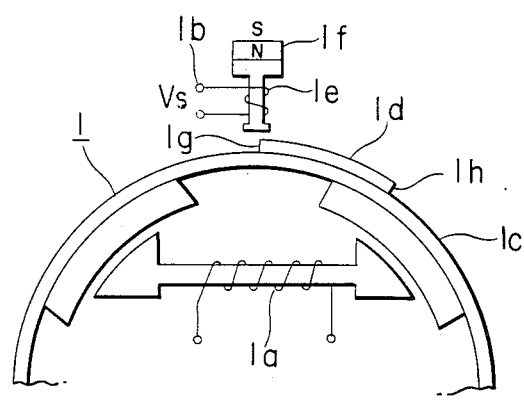
FIG. 2 shows a structure of a magnetic generator.
Figure 3:
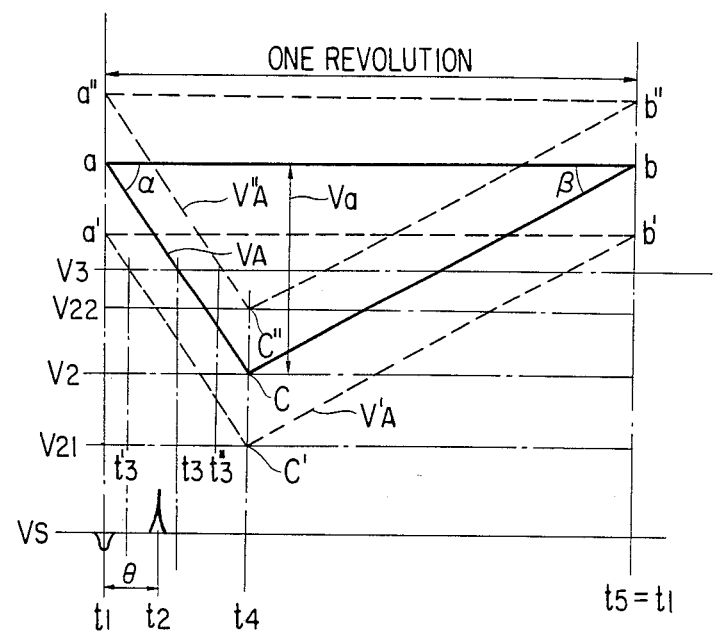
FIG. 3 shows a graph illustrating the changes of signals in a main portions of the ignition timing control apparatus shown in FIG. 1.

There will now be described a first embodiment of this invention with reference to FIGS. 1-4. In FIGS. 1 and 2, a magnetic generator 1 includes a generator coil 1a provided as an ignition power source and a signal coil 1b also provided as a signal generator means. The generator coil 1a develops a voltage corresponding to the revolutions of an engine (not shown) and provides power necessary for the ignition of the engine. The magnetic generator 1 has a rotor 1c which has mounted thereon a signal pole 1d. The signal coil 1b is wound round a signal core 1e to which a magnet 1f is affixed. It is to be noted that as the rotor 1c rotates, the signal pole 1d changes the magnetic resistance of the signal core 1e and the flux of the magnet 1f, thereby developing an alternating voltage Vs across the signal coil 1b. When one end 1g of the signal pole 1d passes by the face of the signal core 1e, a negative voltage is developed while when the other end 1h of the signal pole 1d passes by the face of the signal core 1e, a positive voltage is developed. Between both of the negative and positive voltages, there is an angular difference $\theta$ substantially corresponding to the arcuate angle of the signal pole 1d as shown in FIG. 3.

In FIG. 1, the output of the generator coil 1a is rectified by a diode 2 and is charged by a capacitor 3. An ignition coil 4 includes a primary coil 4a and a secondary coil 4b which is connected to an ignition plug 5. A thyristor 6 disposed as a switching element supplies the charge of the capacitor 3 for the primary coil 4a of the ignition coil 4 at a predetermined time. The thyristor 6 has a gate 6a. A power source circuit 7 includes a diode 7a for shunting the output of the generator coil 1a, a resistor 7b for limiting the shunt current, and a capacitor 7c for charging the shunt current. A zenor diode 7d serves to keep the voltage across the capacitor 7c at a constant voltage which is divided by resistors 7e and 7f to develop a voltage Vcc at a terminal 7g and a voltage Vo at a terminal 7h, these voltages Vcc and Vo being used for an ignition timing control circuit 12 as described hereinafter. The output of the signal coil 1b is connected to a diode 8 and a resistor 9 and is connected to a diode 10 and a resistor 11 connected to ground.

The above noted ignition timing control circuit 12 sets ignition timing on the basis of the signal from the signal coil 1b and provides an ignition signal for the gate 6a of the thyristor 6. This ignition timing control circuit 12 includes a transistor 15, an RS flip-flop (hereinafter abbreviated as F-F) circuit 18, operational amplifiers 20, 23, and 28, resistors 16, 17, 19, 22, 24–27, 30 and 31, and capacitors 21 and 29 connected as shown in FIG. 1.

A throttle switch 14 is interlocked with a throttle valve 13. The throttle switch 14 includes a movable contact 14c in a closed contact position relative to a first contact 14a when the throttle valve 13 is fully opened, and in a closed position relative to a second contact 14b when the throttle valve 13 is fully closed.

In operation, at time point t1 the generator coil 1a of the magnetic generator 1 develops thereacross a voltage corresponding to the engine speed. Current caused by the generated voltage is rectified by the diode 2 and is charged in the capacitor 3. On the other hand, a positive voltage output is generated from the signal coil 1b when the upper terminal of the coil 1b which is also at a positive potential at time point t2 is applied as a first ignition signal to the gate 6a of the thyristor 6 through the diode 8 and the resistor 9.

When the output voltage of the signal coil 1b is positive, no voltage develops across the resistor 11 due to the presence of the diode 10 so that the transistor 15 in the ignition timing control circuit 12 is turned on by the base current thereof flowing through the resistor 16 from the power source 7. Therefore, the set terminal S of the RS F-F circuit 18 is now grounded through the transistor 15, and from the +Q output terminal of the F-F circuit 16 a logic low level signal is provided as an output. This low level signal is received as an input at the inverting terminal of the first OP amplifier 20 through the resistor 19. Since a constant low voltage from the power source circuit 7 is applied to the inverting terminal of the OP amplifier 20, the output of the OP amplifier 20 becomes high. Therefore, the capacitor 21 is, as shown, charged to have a positive polarity on the side of the output of the OP amplifier 20. Since the output terminal of the OP amplifier 20 is connected to the inverting terminal of the second OP amplifier 23 while the output of the OP amplifier 20 is at the high logic level, the second OP amplifier 23 provides as an output therefrom the logic low level signal. Therefore, the F-F circuit 18 is not reset and the output of the +Q terminal thereof remains unchanged. While the non-inverting terminal of the OP amplifier 23 is applied with a reference voltage V2 obtained by changing the voltage Vcc from the power source circuit 7, the value of this reference voltage V2 at the non-inverting terminal of the OP amplifier 23 can be automatically switched over by the throttle switch 14. Namely, when the throttle valve 13 is fully opened, the movable contact 14c of the throttle switch 14 makes contact with the first contact 14a to switch over the reference voltage V2 to a first level V21 at a low level. When the throttle valve 13 is fully closed, the movable contact 14c makes contact with the second contact 14b to switch over the reference voltage V2 to a second level V22 at a high level. Furthermore, when the throttle valve 13 is positioned between the fully opened position and the fully closed position as shown in FIG. 1, the movable contact 14c makes no contact with the first and second contacts 14b and 14a to switch over the reference voltage V2 to a level between the first and the second levels.

The inverting terminal of the third OP amplifier 28 is connected to the output terminal of the OP amplifier 20 through the resistor 22 while the non-inverting terminal thereof is connected to the +Q terminal of the F-F circuit 18 through the resistor 30. Moreover, the output terminal of the OP amplifier 28 is connected to the gate 6a of the thyristor 6 through the capacitor 29 forming a differentiation circuit.

Now when the signal coil 1b has developed thereacross a negative voltage (the grounded terminal of the coil being at a positive potential), current flows through the resistor 11 and the diode 10, whereby a negative voltage is developed across the resistor 11 and is applied as a signal for setting an ignition time to the base 15a of the transistor 15 forming the ignition timing control circuit 12. When a negative voltage is applied to the base 15a, since the voltage at the base 15a of the transistor 15 becomes negative with respect to the emitter, the transistor 15 is turned off only for a time interval lasting for a pulse width of the negative voltage of the signal coil 1b. Therefore, the positive voltage Vcc is applied through the resistor 17 from the power source circuit 7 to the set terminal S of the F-F circuit 18 and the output of the +Q terminal of the F-F circuit 18 is turned to the high level. This high level signal is received as an input at the non-inverting terminal of the OP amplifier 28 through the resistor 30 and at the inverting terminal of the OP amplifier 20 through the resistor 19. Therefore, the output of the OP amplifier 20 changes to the low level, thereby initiating the discharge of the capacitor 21 at a time constant determined by the resistor 19, the capacitor 21, and the voltage value V1 at the non-inverting terminal of the OP amplifier 20. This causes the potential at point A shown in FIG. 1, that is the voltage VA at the inverting terminal of the OP amplifier 23 to be gradually lowered as shown in FIG. 3. Also, when the input voltage to the inverting terminal of the OP amplifier 28 is lowered beyond the voltage V3 at the non-inverting terminal of the OP amplifier 28, the output terminal of the OP amplifier 28 provides as an output therefrom the high level signal which is differentiated by the capacitor 29 and is applied as a second ignition signal to the gate 6a of the thyristor 6.

When the voltage VA at point A is further lowered beyond the reference voltage V2 applied to the non-inverting terminal of the OP amplifier 23, the output of the OP amplifier 23 becomes high. Since this high level signal is applied to the reset terminal R of the F-F circuit 18, the output of the +Q terminal of the F-F circuit 18 changes to the low level, whereby because of the transition of the output of the OP amplifier 20 to the high level, the capacitor 21 is gradually charged again to gradually raise the voltage VA at point A as shown in FIG. 3.

The above operation is repeated each time the negative voltage from the signal coil 1b is applied to the base 15a of the transistor 15 through the resistor 11.

Next, the method of the generation of the second ignition signal will be described with reference to FIG. 3. In the figure, it is supposed that the negative voltage from the signal coil 1b is applied to the base 15a of the transistor 15 at time point t1. The voltage VA at point A in FIG. 1 begins to lower at a constant gradient and then to rise at a constant gradient as mentioned above at time point t4 when it lowers down to the voltage V2 at the non-inverting terminal of the OP amplifier 23. The above operation will be repeated when the negative voltage from the signal coil 1b is generated at time point t5.

The above mentioned operation performed between time points t1 and t5 arises while the generator 1 rotates by one revolution (360°). Since the gradient of the voltage VA varying with the charge or discharge of the capacitor 21 is constant, (t4-t1)/(t5-t1) is also constant. Therefore, even though the engine speed varies, an angular difference corresponding to a time interval between t1 and t4 is maintained constant all the time.

Assuming that the voltage at the non-inverting terminal of the OP amplifier 28 is V3, since the output of the OP amplifier 28 becomes high at time point t3 when the voltages VA crosses the voltage V3, the second ignition signal will be generated.

Figure 4:
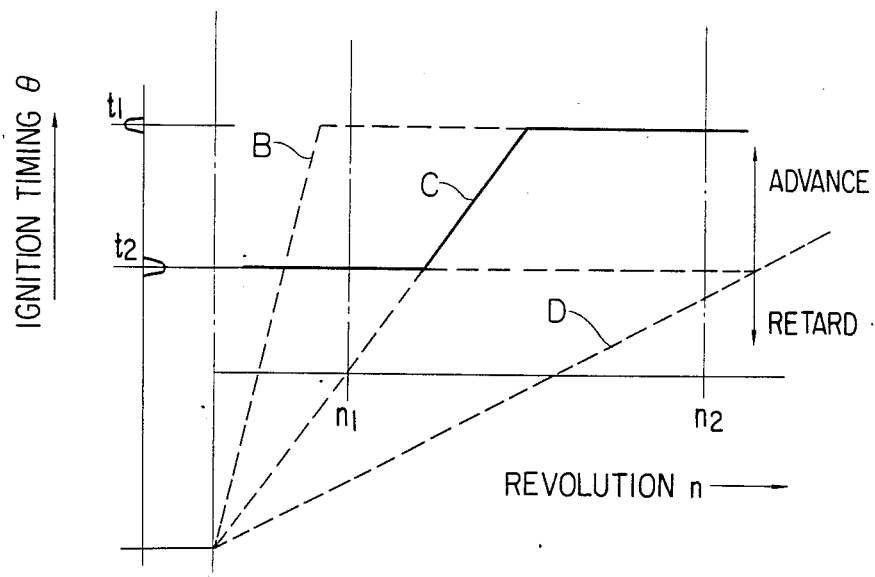
FIG. 4 shows advance angle characteristic curves of the ignition timing of the ignition timing control apparatus shown in FIG. 1.

It is now assumed that the engine is rotating at a lower speed then engine speed n1 shown in FIG. 4. At this time, the voltage V2 is reduced down to the first level V21 by fully opening the throttle valve 13 to contact the movable contact 14c of the throttle switch 14 with the first contact 14a, and the voltage VA is also reduced to VA'. However, since the gradients of VA and VA' are equal to each other, the triangle abc is congruent with the triangle a'b'c' so that the position of time point t4 remains unchanged.

Thus, by the voltage VA being reduced to the voltage VA', a time point at which the voltage VA' crosses the voltage V3 at the non-inverting terminal of the OP amplifier 28 is shifted to t3' so that the second ignition signal is advanced in angle from t3 to t3'.

At higher engine speeds which require a shorter time for one engine revolution (360°), the voltage charged in the capacitor 21 becomes low. Therefore, the voltage VA' at time points t1 and t5 is further reduced accordingly, resulting in the second ignition signal being further advanced in angle. In the vicinity of engine speed n1 (FIG. 4), the voltage VA' at time points t1 and t5 is further reduced below the voltage V3. As a result, at a time point at which the voltage V3 is applied to the non-inverting terminal of the OP amplifier 28, that is at time point t1 when the negative voltage from the signal coil 1b is applied to the base 15a of the transistor 15 through the resistor 11, the output of the OP amplifier 28 becomes high, thereby providing a maximum advance angle for the second ignition signal.

The above operation is done in an extremely short time so that the ignition timing is immediately advanced to the maximum value, whereby the output of the engine is instantaneously increased to enhance the acceleration.

On the other hand, it is now assumed that the throttle valve 13 is fully closed while the engine is rotating at a high speed above engine speed n2 shown in FIG. 4. In this case, the movable contact 14c of the throttle switch 14 contacts with the second contact 14b so that the voltage V2 is increased to the second level V22. While the voltage VA is also increased to VA'', the gradients of the voltages VA and VA'' are equal to each other and therefore the triangle abc is congruent with the triangle a''b''c'' and the angular position of time point t4 remains unchanged.

Thus, when the voltage VA increases to reach the voltage VA'', the voltage VA'' crosses the voltage V3 at the non-inverting terminal of the OP amplifier 28 at time point t3'' so that the second ignition signal is largely retarded to time point t3'' from time point t1. As the engine speed lowers, the voltage VA'' at time points t1 and t5 further increases, thereby further retarding the second ignition signal.

The above operation is done in an extremely short time so that the ignition timing is immediately retarded, whereby the output of the engine is instantaneously reduced to enhance the deceleration. In this case, the ignition timing is not advanced without the engine rotating at a high speed.

Furthermore, in the event that the throttle valve 13 is actuated from an intermediate position between the fully opened position and the fully closed position, the first and the second contacts of the throttle switch 14 are both opened. Therefore, the voltage V2 is maintained at a level between the first level V21 and the second level V22 as shown in the figure, and the ignition timing is advanced corresponding to the engine speed.

In FIG. 4 illustrating ignition timing characteristics as a function of engine speed, characteristic B illustrates the condition where the throttle valve 13 is fully opened, characteristic C illustrates the condition where the throttle valve 13 is positioned between the fully closed position and the fully opened position, and characteristic D illustrates the condition where the throttle valve 13 is fully closed. It is seen from FIG. 4 that when the throttle valve 13 is fully opened in the vicinity of the engine speed n1 the ignition timing is rapidly advanced to the maximum value, when the throttle valve 13 is positioned between the fully opened position and the fully closed position the ignition timing is advanced according to the engine speed, and when the throttle valve 13 is fully closed the ignition timing is rapidly retarded.

The thyristor 6 shown in FIG. 1 is triggered by either the first or second ignition signal whichever is earlier. Therefore, the ignition is operated at time point t2 earlier than time point t3 in the characteristic curve VA of FIG. 3. As the engine speed increases and time point t3 approaches time point t1 beyond t2, the ignition will be operated at time point t3.

Figure 5:
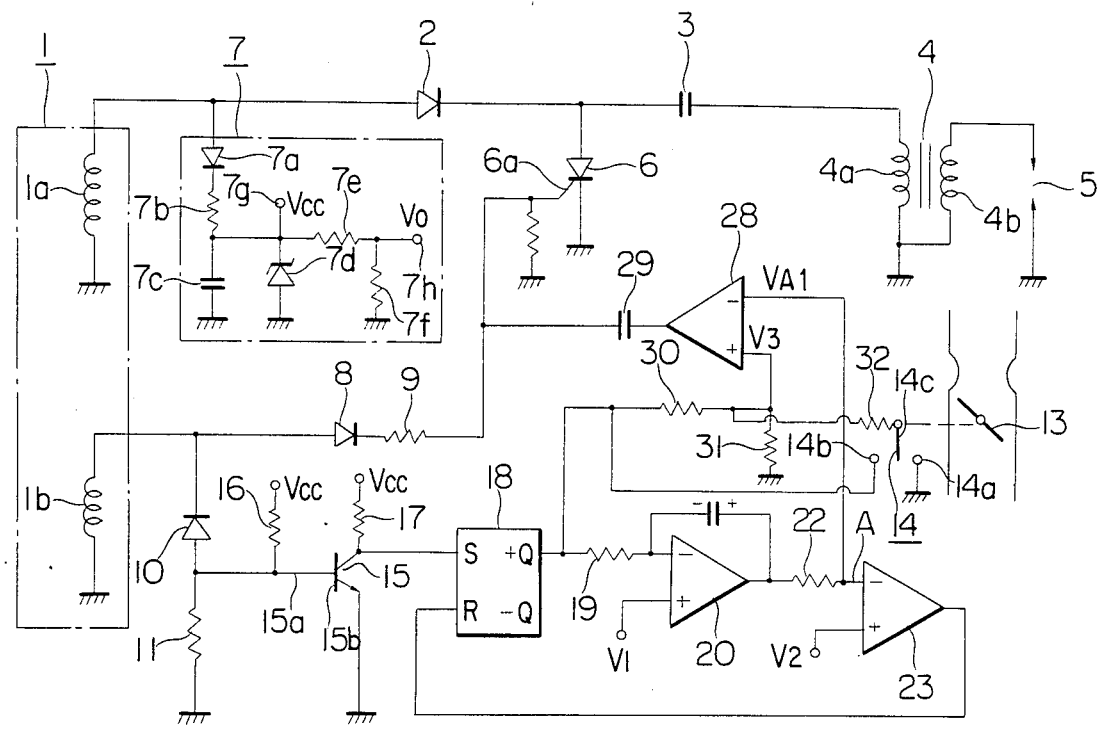
FIG. 5 shows a circuit diagram of an ignition timing control apparatus according to a second embodiment of this invention.
Figure 6:
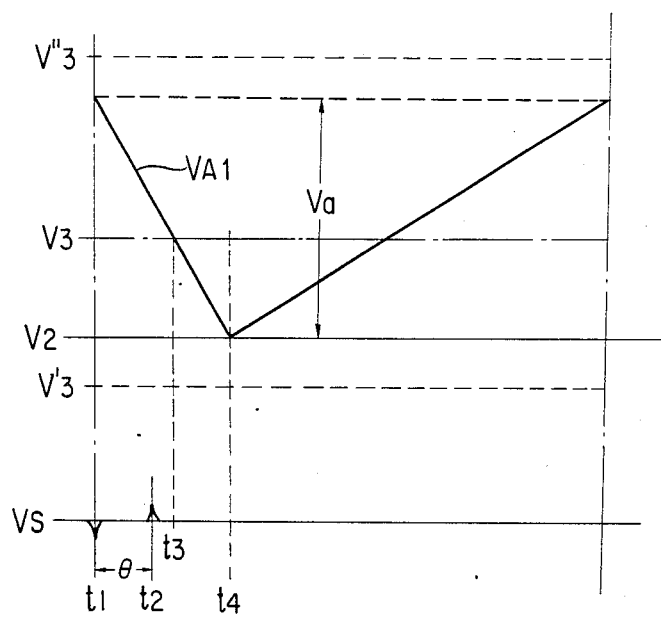
FIG. 6 shows a graph illustrating the changes of signals in a main portion of the ignition timing control apparatus shown in FIG. 5.

A second embodiment of an ignition timing control apparatus according to this invention will now be described with reference to FIGS. 5 and 6. FIG. 5 shows a circuit diagram of an ignition timing control apparatus according to the second embodiment of this invention, and FIG. 6 shows the variation of voltage VA1 at point A in FIG. 5 and an ignitioin timing. In FIG. 5, the voltage V3 at the non-inverting terminal of the OP amplifier 28 is variable i.e. changed over by means of the throttle switch 14. The way the voltage V3 is changed over is similar to the case where the voltage V2 at the non-inverting terminal of the OP amplifier 23 is changed over in the first embodiment, so that the description of the change-over is omitted here. It is to be noted that in this embodiment shown in FIG. 5 the voltage V2 at the non-inverting terminal of the OP amplifier 23 is not changed over.

When the voltage V3 at the non-inverting terminal of the OP amplifier 28 is changed over at either one of three voltage levels V3'', V3, and V3' as shown in FIG. 6 by the throttle switch 14, a time point at which the voltage VA1 crosses the voltage V3 is shifted from t3. For example, in the fully closed position of the throttle valve 13 where the voltage V3 is changed over to V3', if the voltage V3' is equal to or smaller than V2, no advance angle is provided. In the fully opened position of the throttle valve 13 where the voltage V3 is changed over to V3'', if the voltage V3'' is equal to or larger than Va, the maximum advance angle is retained independent of the engine speed. It is to be noted that time point t4 at which the voltage VA begins to rise remains unchanged.

Figure 7:
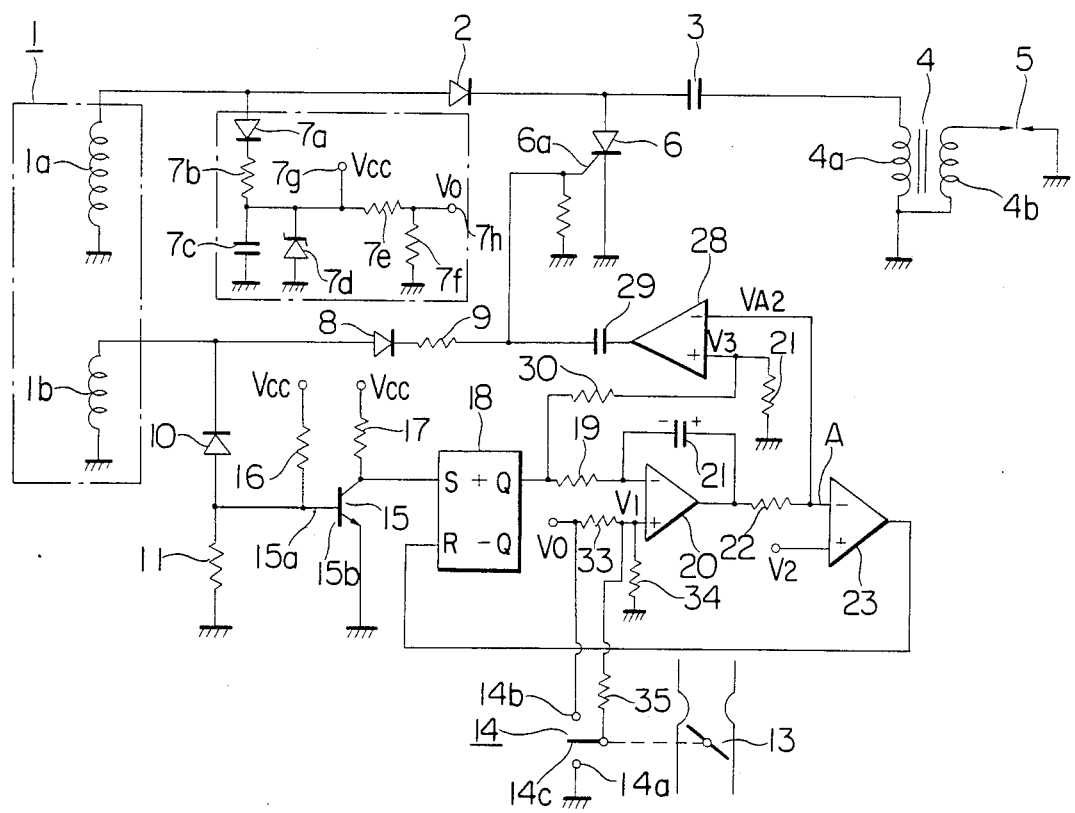
FIG. 7 shows a circuit diagram of an ignition timing control apparatus according to a third embodiment of this invention.
Figure 8:
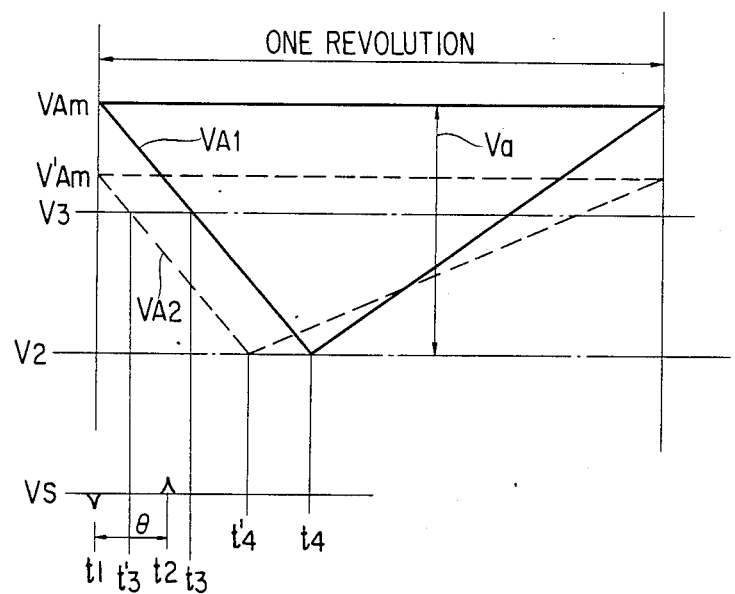
FIG. 8 shows a graph illustrating the changes of signals in a main portion of the ignition timing control apparatus shown in FIG. 7.

A third embodiment of an ignition timing control apparatus according to this invention will now be described with reference to FIGS. 7 and 8. FIG. 7 shows a circuit diagram of an ignition timing control apparatus of the third embodiment of this invention. In FIG. 7, the voltage V1 of the non-inverting terminal of the OP amplifier 20 is variable i.e. changed over by the throttle switch 14. The way the voltage V1 is changed over is similar to the case where the voltage V2 at the non-inverting terminal of the OP amplifier 23 is changed over as described in the first embodiment shown in FIG. 1 according to this invention, so that the description of the change-over is omitted here. It is to be noted that in this embodiment also the voltage V2 is not changed over. When the voltage V1 is changed to a small value by the operation of the throttle switch 14, the maximum value of the charged voltage of the capacitor 21 is reduced so that the maximum value V+Am of voltage VA2 at point A is lowered as shown in FIG. 8 by the dotted line. As a result, the time point at which the voltage VA2 crosses the voltage V3 is advanced from t3 up to t3'. Therefore, by setting V1 to be lower when in the fully opened position of the throttle valve 13, and by setting V1 to be higher when in the fully closed position, the same effect is obtained as set forth in the first and second embodiments of this invention. It is to be noted that in this third embodiment, a time point at which the voltage VA2 begins to rise is shifted from t4 to t4'.

A fourth embodiment of an ignition timing control apparatus according to this invention will now be described with reference to FIGS. 9-11.

Figure 9:
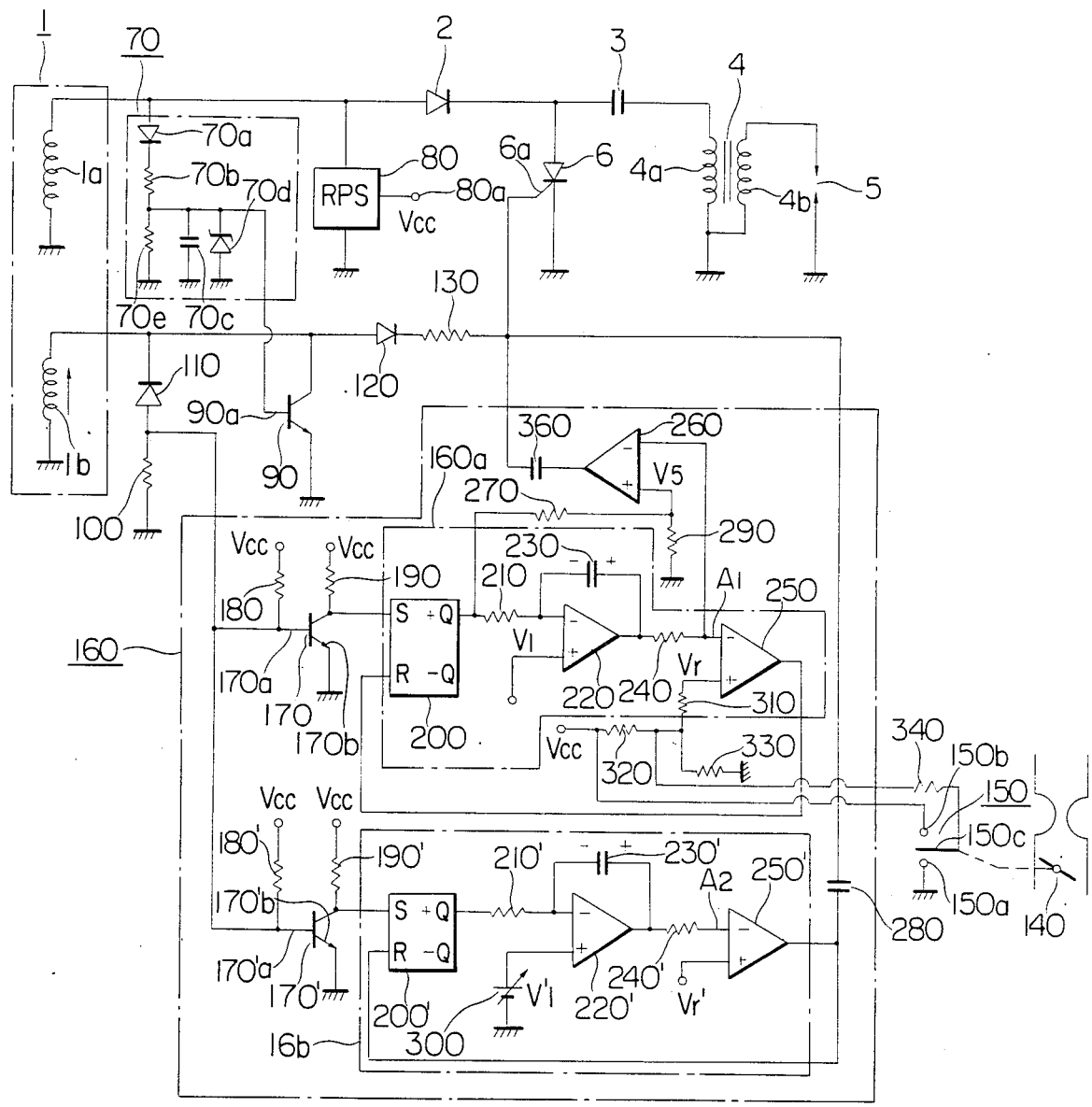
FIG. 9 shows a circuit diagram of an ignition timing control apparatus according to a fourth embodiment of this invention.

In FIG. 9 which shows a circuit diagram of an ignition timing control apparatus of the fourth embodiment of this invention, the structure as well as the operation of the magnetic generator 1 are the same as those described with reference to the first embodiment shown in FIGS. 1 and 2, so that the description thereof is omitted.

An engine operating condition detector 70 includes a diode 70a for shunting the output current of the generator coil 1a and a resistor 70b connected to the cathode of the diode 70a. The resistor 70b is connected to a capacitor 70c for charging the shunt current flowing through the resistor 70b. A zenor diode 70d regulates the terminal voltage across the capacitor 70c to a predetermined voltage. The combination of the resistor 70b and the capacitor 70c forms a time constant circuit from the initiation of the voltage generation of the generator coil 1a to the attainment of the above predetermined voltage, resulting in a circuit for detecting a constant time after the engine is started. Since the output voltage of the generation coil 1a varies with the rotation of the engine, the time to attain the above predetermined voltage also varies. Therefore, the combination of the resistor 70b and the capacitor 70c also forms a circuit for detecting the engine speed. A resistor 70e in the detector 70 forms a circuit for discharging the charge of the capacitor 70c in a constant time after the engine is stopped. The zenor diode 70d keeps the above discharging time constant by regulating the terminal voltage across the capacitor 70c to a predetermined value. The engine operating condition detector 70 thus arranged provides as a predetermined output signal therefrom the above predetermined voltage when a constant time has lapsed after the engine is started or the engine speed has attained a predetermined value.

A regulated power source circuit 80 receives as an input the voltage of the generation coil 1a to develop a constant voltage Vcc which is supplied through an output terminal 80a to various portions of an ignition timing control circuit 160 which will be hereinafter described.

A transistor 90 is made conductive when the predetermined output signal is provided from the engine operating condition detector 70, thereby interrupting a first ignition signal from the signal coil 1b to the gate 6a of the thyristor 6. A resistor 100 and a diode 110 serve to pass therethrough a negative current resulting from the signal coil 1b while a resistor 13 and a diode 120 serve to pass therethrough a positive current resulting from the signal coil 1b.

A throttle switch 150 is interlocked with the throttle valve which has been described above, and consists of a first contact 150a closed when the throttle valve 140 is fully opened, a second contact 150b closed when the throttle valve 140 is fully closed, and a movable contact 150c for contacting with the first contact 150 a or the second contact 150b.

The above noted ignition timing control circuit 160 calculates an ignition timing on the basis of a negative pulse voltage as an advancing angle signal provided as an output from the signal coil 1b, and develops a second ignition signal to the gate 6a of the thyristor 6. The calculated ignition timing is such that the second ignition timing signal is advanced in angle when the movable contact 150c of the throttle switch 150 makes contact with the first contact 150a, is retarded in angle when the movable contact 150c makes contact with the second contact 150b, and is advanced in angle corresponding to the engine speed when the movable contact 150c makes no contact with the first and second contacts 150a and 150b. The ignition timing control circuit 160 also provides as an output therefrom a third ignition signal which is retarded behind the first ignition from the signal coil 1b.

In operation, the generator coil 1a of the magnetic generator 1 develops thereacross a voltage corresponding to the engine speed. Current resulting from the developed voltage charges the capacitor 3 after by the rectification of the diode 2.

Figure 10:
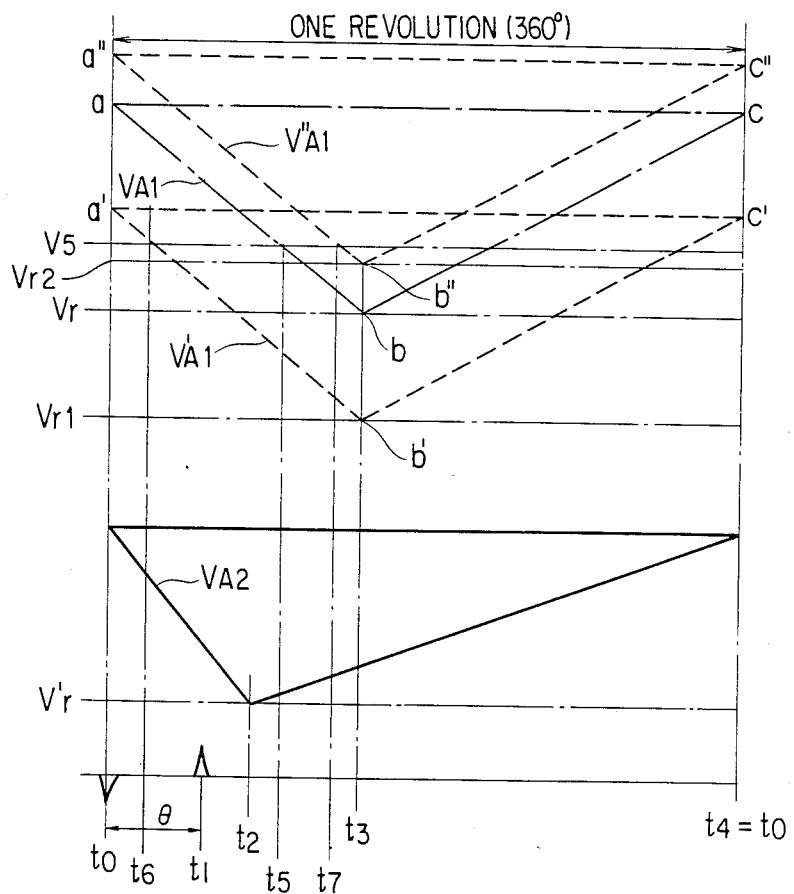
FIG. 10 shows a graph illustrating the changes of signals in a main portion of the ignition timing control apparatus shown in FIG. 9.

On the other hand, a positive pulse voltage provided as a retarding signal from the signal coil 1b is applied as the first ignition signal to the gate 6a of the thyristor 6 at time point t1 shown in FIG. 10 through the diode 120 and the resistor 130. At this time, the bases 170a and 170'a respectively of NPN transistors 170 and 170' in the ignition timing control circuit 160 are applied with the voltage Vcc from the power source circuit 80 respectively through resistors 180 and 180' to turn the transistors 170 and 170' on. Therefore, the set terminals S of an RS flip-flop (hereinafter abbreviated as F-F) circuits 200 and 200' are grounded respectively through the transistors 170 and 170' so that a low logic level signal is provided as an output respectively from +Q terminals of the RS F-F circuits 200 and 200'. These low level signals are received as outputs respectively at the inverting input terminals respectively of the OP amplifier 210 and 210'. The non-inverting input terminal of the OP amplifier 220 is applied with a voltage V1 obtained by changing the voltage Vcc by means of a circuit not shown in FIG. 9 but as shown in FIG. 1 by the circuit 7 while the non-inverting input terminal of the OP amplifier 220' is applied with voltage V1' from a variable voltage power source 300. Therefore, the outputs of the OP amplifiers 220 and 220' will be at a high logic level. Hence, the capacitors 230 and 230' are charged with respective polarities as shown. Also, since the output terminals of the OP amplifiers 220 and 220' are connected respectively to the inverting terminals respectively of third and fourth OP amplifiers 250 and 250' respectively through resistors 240 and 240' and further any one of the outputs of the OP amplifiers 220 and 220' is at the high level, the OP aplifier 250 and 250' respectively provide as outputs therefrom the low level signal to the reset terminals R respectively of the F-F circuits 200 and 200'. Therefore, the F-F circuits 200 and 200' are not reset so that the outputs from the +Q terminals thereof remain unchanged. A reference voltage Vr provided by changing over the output voltage Vcc of the power source circuit 80 is applied to the non-inverting input terminal of the OP amplifier 250. This reference voltage Vcc is automatically changed over by the operation of the throttle switch 150 as follows: in the fully opened position of the throttle valve 140 the movable contact 150c of the throttle switch 150 makes contact with the first contact 150a to change over the reference voltage Vr to a first level Vr1, which relatively indicates a low voltage, by means of resistors 310–340; in the fully closed position of the throttle valve 140 the movable contact 150c makes contact with the second contact 150b to change over the reference voltage Vr to a second level Vr2, which relatively indicates a high voltage, by means of the resistors 310–340; and, in an intermediate position between the fully opened position and the fully closed position of the throttle valve 140 the movable contact 150c makes no contact with the first or second contacts 150a and 150b to change over the reference voltage Vr to an intermediate level between the first and the second levels Vr1 and Vr2. The non-inverting input terminal of the OP amplifier 250' is applied with a voltage Vr' provided by varying the voltage Vcc from the power source circuit 80 with a circuit (not shown). The inverting terminal of the fifth OP amplifier 260 is connected to the output terminal of the OP amplifier 220 through a resistor 240 while the non-inverting input terminal of the OP amplifier 260 is connected to the +Q output terminal of the F-F circuit 200 through a resistor 270. The output terminal of the OP amplifier 260 is connected to the gate 6a of the thyristor 6 through a capacitor 360 forming a differentiation circuit.

Also, the output terminal of the OP amplifier 250' is connected to the gate 6a of the thyristor 6 through a capacitor 280 forming a differentiation circuit. It is to be noted that the non-inverting input terminal of the OP amplifier 260 is grounded through a resistor 290.

When a negative pulse voltage which is a retarding signal is developed across the signal coil 1b, current flows through the resistor 100 and the diode 110 to develop across the resistor 100 a negative voltage which is applied to the bases 170a and 170a' respectively of the transistors 170 and 170' included in the ignition timing control circuit 160. When the negative voltage is applied to the bases 170a and 170a', since the respective voltages at the bases 170a and 170a' become negative with respect to the emitters 170b and 170b', the transistors 170 and 170' are made off only for a time interval during a pulse width of the negative voltage generated by the signal coil 1b. Therefore, the set terminals S respectively of the F-F circuits 200 and 200' are applied with the positive voltage Vcc through the resistors 190 and 190' from the power source circuit 80, whereby the respective outputs of the +Q terminals respectively of the F-F circuit 200 and 200' are turned to the high level. These high level signals are respectively received as an input at the inverting terminals respectively of the OP amplifiers 220 and 220' through the resistors 210 and 210', and the high level signal from the F-F circuit 200 is also received as an input at the non-inverting input terminal of the OP amplifier 260. Therefore, the outputs of the OP amplifiers 220 and 220' are turned to the low level, thereby initiating the discharge of the capacitor 230 at a time constant determined by the resistor 210, the capacitor 230, and the voltage value V1 of the non-inverting terminal of the OP amplifier 220. Similarly, the charge of the capacitor 230 also begins to be discharged at a time constant determined by the resistor 210', the capacitor 230', and the voltage value V1' of the non-inverting terminal of the OP amplifier 220'. This causes the potential at points A1 and A2 shown in FIG. 9, that is the voltages VA1 and VA2 respectively at the inverting terminals respectively of the OP amplifiers 250 and 250' to be gradually lowered at a constant gradient as shown in FIG. 10 by a solid line. Simultaneously, the input voltage at the inverting terminal of the OP amplifier 260 starts to lower, and when it lowers beyond voltage V5 at the non-inverting terminal of the OP amplifier 260, the output terminal of the OP amplifier 260 provides as an output therefrom the high level signal which is differentiated by the capacitor 360 and is then applied as a second ignition signal to the gate 6a of the thyristor 6 at time point t5 shown in FIG. 10.

When the voltage VA1 at point A1 further lowers down to the reference voltage Vr applied to the non-inverting terminal of the OP amplifier 250, the output of the OP amplifier 250 becomes high. Since this high level signal is applied to the reset terminal R of the F-F circuit 200, the output of the +Q terminal of the F-F circuit 200 changes to the low level, whereby because of the transition of the output of the OP amplifier 210 to the high level, the capacitor 230 is gradually charged again to gradually raise the voltage VA1 at point A1 at a constant gradient from time point t3 as shown in FIG. 10 by a solid line.

When the voltage VA2 at the inverting terminal of the OP amplifier 250' lowers down to the voltage Vr', the OP amplifier 250' provides as an output the high level signal which is differentiated by the capacitor 280 and then applied as the third ignition signal to the gate 6a of the thyristor 6 at time point t2 shown in FIG. 10.

At the same time, the high level signal from the OP amplifier 250' is applied to the reset terminal R of the F-F circuit 200' so that the output of the +Q terminal of the F-F circuit 200' is turned to the low level signal, whereby the output of the capacitor 230' is turned to the high level signal and therefore the capacitor 230' is gradually charged to gradually raise the voltage VA2 at point A2 at a constant gradient as shown in FIG. 10 by a solid line.

The above operation is repeated each time the negative voltage from the signal coil 1b develops thereacross a negative pulse voltage.

The engine operating condition detector 70 provides as a predetermined output signal therefrom a predetermined voltage to the base 90a of the transistor 90 when a predetermined time interval has lapsed or the engine speed has reached a predetermined value. When the above predetermined voltage is applied to the base 90a of the transistor 90, the transistor 90 is turned on and thereafter shortcircuits a positive pulse voltage from the signal coil 1b to prevent it from being applied as the first signal to the gate 6a of the thyristor 6.

Next, the method and the time of the generation of the first, second, and third ignition signals will be described with reference to FIG. 10 in which the abscissa designates rotation angle and the ordinate designates potential while the voltage curve at point A1 in FIG. 9 is shown in the upper half and the voltage curve at point A2 in FIG. 9 is shown in the lower half.

In FIG. 10, it is supposed that the negative pulse voltage which is an advancing signal is generated by the signal coil 1b at time point $t_o$ and the positive pulse voltage which is a retarding signal is generated by the signal coil 1b at time point t1. It is to be noted that the positive pulse voltage generated at time point t1 is the above noted first ignition signal. When the negative pulse voltage is applied to the bases 170a and 170a' respectively of the transistors 170 and 170', the voltage VA1 at time point A1 in FIG. 9 and the voltage VA2 at time point A2 gradually decrease at a constant gradient as shown in FIG. 10 by respective solid lines. Then at time point t5 when the voltage VA1 decreases beyond the voltage V5 at the non-inverting terminal of the OP amplifier 260, the OP amplifier 260 provides as an output therefrom the high level signal which is differentiated by the capacitor 360 to become the above noted second ignition signal. Then at time point t3 when the voltage VA1 further decreases down to the voltage Vr at the non-inverting terminal of the OP amplifier 250, the voltage VA1 begins to rise at a constant gradient as mentioned above. On the other hand, at time point t2 when the voltage VA2 decreases beyond the voltage Vr' at the non-inverting terminal of the OP amplifier 250', the OP amplifier 250' provides as an output therefrom the high level signal which is differentiated by the capacitor 280 to become the above noted third ignition signal while at the same time, the voltage VA2 begins to rise at a constant gradient as shown in the lower part of FIG. 10. The above operation will be repeated when the negative voltage is generated from the signal coil 1b at time point t4.

Although the gate 6a of the thyristor 6 is applied with the above first-third ignition signals, the discharge operation of the capacitor 3 is initiated only by the earliest signal from among those three ignition signals.

The above mentioned operation performed between time points $t_o$ and t4 arises while the magnetic generator 1 rotates by one revolution (360°). Since the gradients of the voltages VA1 and VA2 varying with the charge or discharge of the capacitors 230 and 230' are respectively constant, $(t3-t_o)/(t4-t_o)$ and $(t2-t_o)/(t4-t_o)$ are also constant. Therefore, even though the engine speed varies, the angular differences respectively corresponding to time intervals between $t_o$-t3 and $t_o$-t2 are kept constant all the time.

The method of advancing the above ignition timing signal will now be described. It is here assumed that the voltage Vr is reduced to Vr1 at the first level by fully opening the throttle valve 140 to contact the movable contact 150c of the throttle switch 150 with the first contact 150a while the engine rotates at a speed lower than engine speed n1 shown in FIG. 11. At this time, the voltage VA1 is also reduced to VA1'. However, since the gradients of VA1 and VA1' are equal to each other, the triangle abc is congruent with the triangle a'b'c' so that the angular position of time point t3 remains unchanged.

Thus, by the voltage VA1 being reduced to the voltage VA1', a time point at which the voltate VA1' crosses the voltage V5 at the non-inverting terminal of the OP amplifier 260 is shifted to t6 so that the second ignition signal has been advanced in angle from t5 to t6.

At higher engine speeds which require a shorter time for one engine revolution (360°), the voltage charged in the capacitor 230 becomes low. Therefore, the voltage VA1' at time points $t_o$ and t4 is further reduced accordingly, resulting in the second ignition signal being further advanced in angle beyond t6. In the vicinity of engine speed n1, the voltage VA1' at time points $t_o$ and t4 is further reduced beyond the voltage V5. As a result, at a time point at which the voltage V5 is applied to the non-inverting input terminal of the OP amplifier 260, that is at time point $t_o$ when the negative pulse voltage from the signal coil 1b is applied to the base 170a of the transistor 170 through the resistor 100, the output of the OP amplifier 260 becomes high, thereby providing a maximum advance angle (BTDC 25° in this embodiment) for the second ignition signal.

The above operation is done in an extremely short time so that the ignition timing is immediately advanced to the maximum value, whereby the output of the engine is instantaneously increased to enhance the acceleration.

Figure 11:
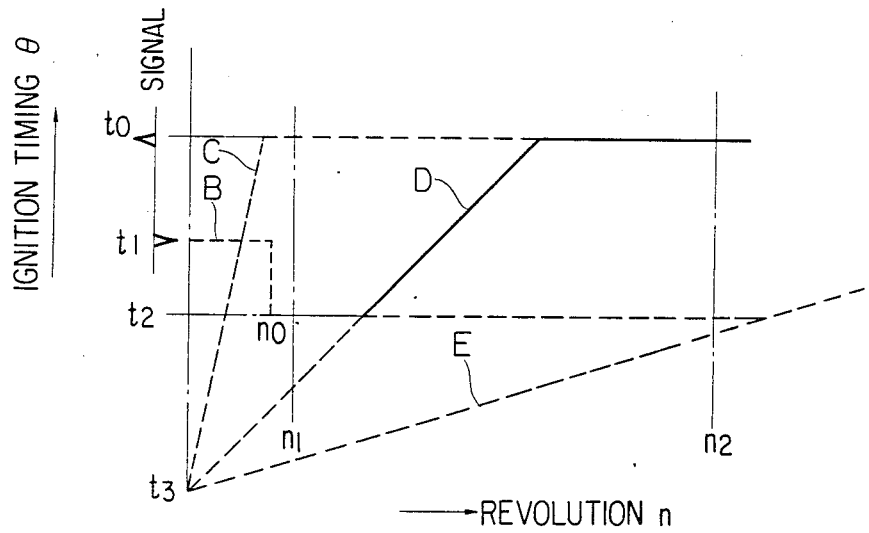
FIG. 11 shows advance angle characteristic curves of the ignition timing of the ignition timing control apparatus shown in FIG. 9.

On the other hand, it is now assumed that the throttle valve 140 is fully closed while the engine is rotating at a high speed above engine speed n2 shown in FIG. 11. In this case, the movable contact 150c of the throttle switch 150 makes contact with the second contact 150b so that the voltage Vr is increased to the second level Vr2. While the voltage VA1 is also increased to VA1", the gradients of the voltages VA1 and VA1" are equal to each other and therefore the triangle abc is congruent with the triangle a"b"c" and the anglular position of time point t3 remains unchanged.

Thus, when the voltage VA1 increases to reach the voltage VA1", the voltage VA1" crosses the voltage V5 at the non-inverting input terminal of the OP amplifier 260 at time point t7 so that the second ignition signal is largely retarded to time point t7 from time point $t_o$. As the engine speed decreases, the voltage VA1" at time points $t_o$ and t4 further increase, thereby further retarding the second ignition signal beyond t7.

The above operation is done in an extremely short time so that the ignition timing is immediately retarded, whereby the output of the engine is instantaneously increased to enhance the deceleration. In this case, the ignition timing is not advanced unless the engine is rotating at an extremely high speed.

Furthermore, in the event that the throttle valve 140 is actuated in an intermediate position between the fully opened position and the fully closed position, the first and the second contacts of the throttle switch 150 are both opened. Therefore, the voltage Vr is maintained at a level between the first level Vr1 and the second level Vr2, and the ignition timing is advanced corresponding to the engine speed.

In FIG. 11 illustrating the ignition timing characteristics as a function of engine speed, characteristic B illustrates the starting condition of engine, characteristic C illustrates the condition where the throttle valve 140 is fully opened, characteristic D illustrates the condition where the throttle valve 140 is positioned between the fully closed position and the fully opened position, and characteristic E illustrates the condition where the throttle valve 140 is fully closed. Although the engine is started with the first ignition signal generated at time point t1, when a predetermined time interval has lapsed after the engine is started or when the engine speed has reached, for example $n_o$, the transistor 90 in FIG. 9 is turned on to prevent the first ignition signal from being applied to the gate 6a of the thyristor 6 so that thereafter the first ignition signal will not contribute to the ignition of the engine which will be activated by the third ignition signal generated at time point t2, as shown in FIG. 11 by characteristic B. When the engine speed is around n1 indicating an idling condition and the throttle valve 140 is fully opened, the generation of the second ignition signal reaches time point $t_o$ whereby the ignition timing is advanced to the maximum angle for providing rapid acceleration, as shown in FIG. 11 by characteristic curve C. When the throttle valve 140 is actuated between the fully closed position and the fully opened position, the ignition timing is advanced along characteristic D shown in FIG. 11 corresponding to the engine speed. When the throttle valve 140 is fully closed, the second ignition signal is rapidly retarded as shown by characteristic E in FIG. 11, in which case the engine speed is rapidly reduced because the engine is being ignited with the third ignition signal generated at time point t2 prior to time point t3. This third ignition signal is generated at time point t2 (ATDC 5° in this embodiment) behind time point t1 (BTDC 5° in this embodiment) at which the first ignition signal is generated, and therefore the speed of the engine as ignited by the third ignition signal becomes lower than that as ignited by the first ignition signal. Namely, the idling speed lowers and the output of the engine is reduced, resulting in a more stable engine speed, whereby a stable speed region is extended. It is to be noted that if the power source circuit 300 providing V1' of the OP amplifier 220' is of a variable voltage type, the idling speed is adjustable by regulating time point t2.

Furthermore, in this embodiment, since the magnetic generator 1 is completely fixed in the crank case (not shown) of the engine, the durability and the reliability of the apparatus in regard to vibration of the engine are also improved.

Figure 12:
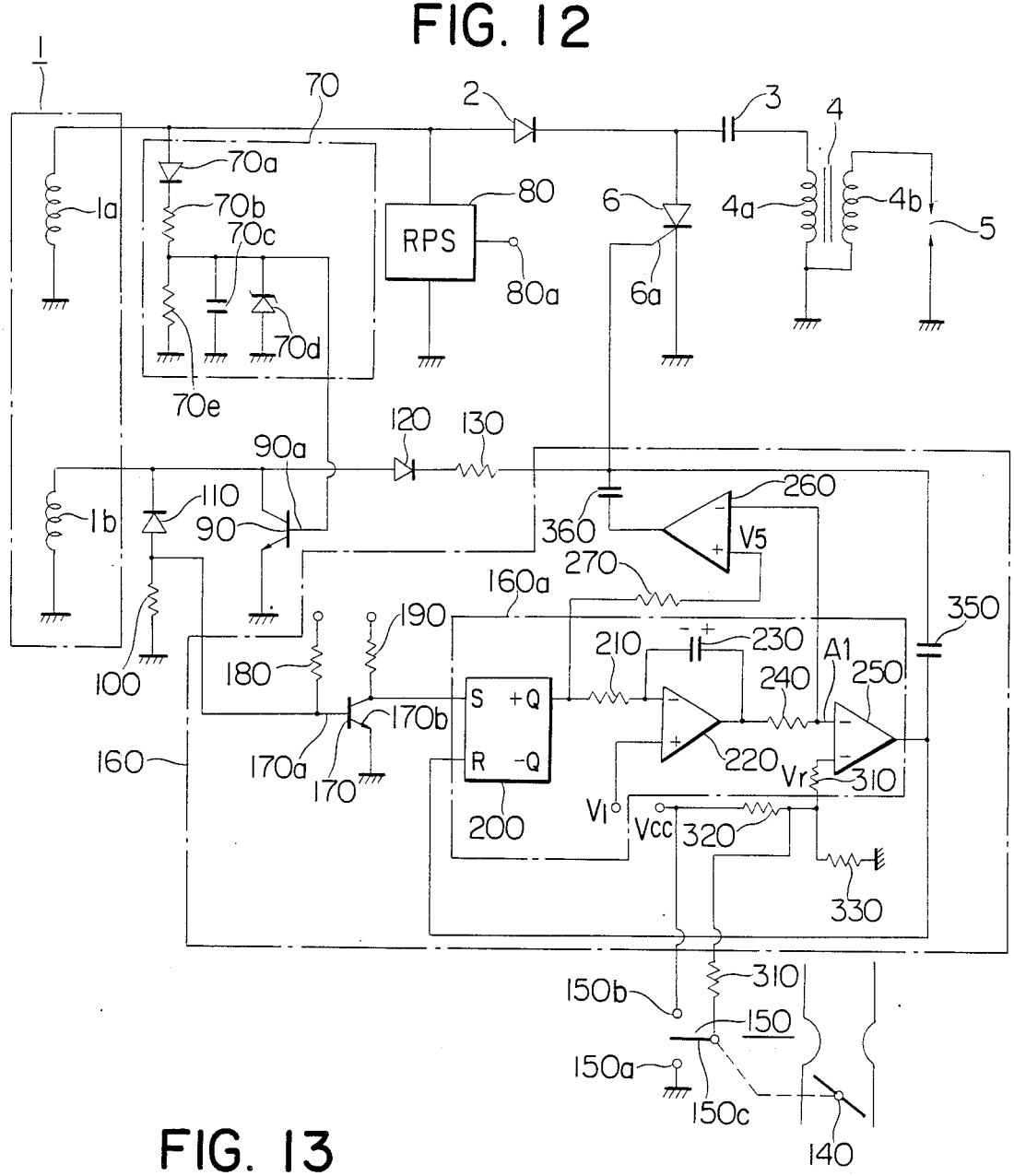
FIG. 12 shows a circuit diagram of an ignition timing control apparatus according to a fifth embodiment of this invention; and, FIG. 13 shows advance angle characteristic curves of the ignition timing of the ignition timing control apparatus shown in FIG. 12.

A fifth embodiment of an ignition timing control apparatus according to this invention will now be described with reference to FIGS. 12 and 13. In FIG. 12 showing a circuit diagram of an ignition timing control apparatus according to the fifth embodiment of this invention, an ignition timing control circuit 160 includes a constant angle oscillator 160a formed of the F-F circuit 200, OP amplifiers 220 and 250, the resistors 210 and 240, and the capacitor 230. The output terminal of the OP amplifier 250 is connected to the reset terminal R of the F-F circuit 200 and to the gate 6a of the thyristor 6 through a capacitor 350 forming a differentiation circuit. Other arrangements except for the constant angle oscillator 160b in FIG. 9 are the same as shown in FIG. 9 so that the description thereof is omitted.

In operation, a positive pulse voltage from the signal coil 1b which is a retarding signal is applied as a first ignition signal to the gate 6a of the thyristor 6. At this time, the capacitor 230 is charged with the polarity shown in FIG. 12 to raise the voltage VA1 at point A as already described above.

When a negative pulse voltage from the signal coil 1b is applied to the base 170a of the transistor 170, the capacitor 230 begins to be discharged so that the voltage VA1 begins to decrease at a constant gradient and reaches the voltage V5 which is applied to the non-inverting input terminal of the OP amplifier 260. At this time, the OP amplifier 260 provides as an output therefrom the high level signal which is differentiated by the capacitor 360 to become a second ignition signal. When the voltage VA1 further decreases below the reference voltage Vr applied to the non-inverting input terminal of the OP amplifier 250, the OP amplifier 250 provides as an output therefrom the high level signal which is differentiated by the capacitor 350 to become a third ignition signal and which is also applied to the reset terminal R of the F-F circuit 200. Therefore, at this moment the voltage VA1 again begins to increase at a constant gradient.

It is to be noted that the method of advancing the second ignition signal is the same as described with reference to the above embodiments so that the description thereof is omitted. It is also to be noted that the thyristor 6 is triggered by the earliest of the first, second, or third ignition signal.

Figure 13:
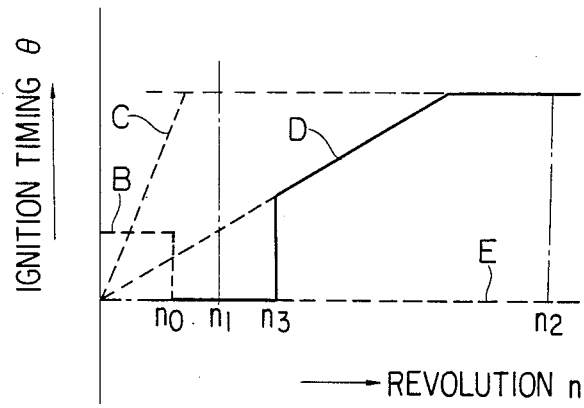

In FIG. 13 showing an advance angle characteristic of ignition timing, characteristics B, C, D, and E respectively correspond to characteristics B, C, D, and E shown in FIG. 11. It is seen from characteristic D that at engine speed n3 the ignition timing is rapidly advanced and from characteristic E that the ignition timing is retarded to the minimum angle, for example ATDC 5°, in the fully closed position of the throttle valve 140. Other characteristics are the same as shown in FIG. 11 so that the description thereof is omitted.

It is to be noted that while this invention has been described with reference to the above embodiments, this invention is not limited to those embodiments but various modifications of this invention are possible without departing from the spirit of this invention.

What we claim is:

1. An ignition timing control apparatus comprising:
    an ignition power source for generating power for the ignition of said engine;
    a switching element for respectively connecting and disconnecting the power from said ignition power source to the ignition coil of said engine at a predetermined time;
    signal generator means for generating signals for setting an ignition timing corresponding to the revolutions of said engine;
    an ignition timing control circuit for computing ignition timing for said engine on the basis of signals from said signal generator means and providing an ignition signal representing said ignition timing to said switching element; and
    a throttle switch interlocked with a throttle valve of said engine and having a first contact in a closed position when the throttle valve is fully opened and a second contact in a closed position when the throttle valve is fully closed, said first and second contacts being both opened between the fully opened and fully closed positions of said throttle valve;
    said ignition timing control circuit including means for setting the ignition timing in an advanced angle condition and means for setting the ignition timing in a retarded angle condition, means for retaining the ignition timing in the advanced angle condition as set by said setting means when the throttle switch closes the first contact, means for retaining the ignition timing in the retarded angle condition as set by said setting means when the throttle switch closes the second contact, and means for advancing the ignition timing corresponding to the revolutions of said engine according to the signals from said signal generator means between the fully closed and the fully opened positions of said throttle valve when the first and second contacts of the throttle switch are both opened.

2. An ignition timing control apparatus as claimed in claim 1 wherein said ignition power source comprises a generator coil for generating an AC voltage corresponding to the revolutions of said engine.

3. An ignition timing control apparatus as claimed in claim 1 wherein said switching element comprises a thyristor.

4. An ignition timing control apparatus as claimed in claim 1 wherein said throttle switch changes a reference voltage provided by said ignition power source to said ignition timing control circuit according to the operation of said throttle switch.

5. An ignition timing control apparatus as claimed in claim 1 wherein said signal generator means comprises a signal coil for generating positive and negative signals for setting the ignition timing corresponding to the revolutions of said engine.

6. A ignition timing control apparatus as claimed in claim 5 wherein said ignition timing control circuit comprises:
    a first circuit for applying a retarding signal as a first ignition signal from one of the positive and negative signals from said signal generator means to said switching element;
    a second circuit for calculating the ignition timing on the basis of an advancing signal from one of the positive and negative signals from said signal generator means and for generating a second ignition signal at a constant advanced timing when said throttle switch closes said first contact, at a constant retarded timing when said throttle switch closes said second contact, or at a timing corresponding to the revolutions of said engine when said first and second contacts are both opened during mid-range engine speed; and
    a third circuit for generating a third ignition signal which is retarded behind said first ignition signal on the basis of an advancing signal from one of the positive and negative signals from said signal generating means and which is supplied to said switching element as the ignition signal representing the set ignition timing.

7. An ignition timing control apparatus as claimed in claim 6 wherein said third circuit comprises:
- a switching device made conductive/non-conductive according to the positive or negative signal provided as an output from said signal generator means;
- a flip-flop circuit whose output level is reversed according to the conductive/non-conductive condition of said switching element;
- a first comparator whose inverting input terminal is connected to the output terminal of said flip-flop circuit and whose non-inverting input terminal is applied with a variable voltage;
- a capacitor connected between the non-inverting input terminal and the output terminal of said first comparator; and,
- a second comparator whose inverting input terminal is connected to the output terminal of said first comparator, whose non-inverting input terminal is connected to the output terminal of said flip-flop circuit, and whose output terminal provides as an output therefrom said third ignition signal which is retarded behind said first ignition signal.

8. An ignition timing control apparatus as claimed in claim 6 further comprising: an engine operating condition detector means for providing as an output therefrom a predetermined signal when a predetermined time interval has lapsed after the start of said engine, and an interruption means for interrupting said first ignition signal for said switching element when said predetermined signal is provided as an output from said engine operating condition detector means.

9. An ignition timing control apparatus as claimed in claim 6 further comprising: an engine operating condition detector means for providing as an output therefrom a predetermined signal when the revolutions of said engine have reached a predetermined value, and an interruption means for interrupting said first ignition signal for said switching element when said predetermined signal is provided as an output from said engine operating condition detector means.

10. An ignition timing control apparatus according to claim 1 wherein said ignition power source and said signal generator means are both provided by the same magnetic generator driven according to the revolutions of the engine.

11. An ignition timing control apparatus according to claim 10 wherein said magnetic generator is provided with a coil for generating said ignition power and a coil for generating said ignition timing setting signals.

12. An ignition timing control apparatus comprising:
- an ignition power source for generating a reference voltage and providing power necessary for the ignition of said engine;
- a switching element for respectively connecting and disconnecting the power from said ignition power source to the ignition coil of said engine at a predetermined time;
- signal generator means for generating signals for setting an ignition timing corresponding to the revolutions of said engine;
- an ignition timing control circuit for computing ignition timing for said engine on the basis of the signals from said signal generator means and providing an ignition signal representing said ignition timing to said switching element;
- a throttle switch interlocked with a throttle valve of said engine and having a movable contact in a closed position relative to a first contact when the throttle valve is fully opened and in a closed position relative to a second contact when the throttle valve is fully closed for changing said reference voltage according to the position of said throttle valve;
- said ignition timing control circuit comprising:
  - a switching device switching between conductive and non-conductive conditions according to the setting signal provided as an output from said signal generator means;
  - a flip-flop circuit, the output level of which is reversed by the conductive and non-conductive conditions of said switching element;
  - a first comparator, the inverting input terminal of which is connected to the output terminal of said flip-flop circuit;
  - a capacitor connected between the non-inverting input terminal and the output terminal of said first comparator;
  - a second comparator, the inverting input terminal of which is connected to the output terminal of said first comparator, the non-inverting input terminal of which is connected to receive said reference voltage changed according to the position of said throttle valve, and the output terminal of which is connected to an input of said flip-flop circuit;
  - a third comparator, the inverting input terminal of which is connected to the output terminal of said first comparator, the non-inverting terminal of which is connected to the output terminal of said flip-flop circuit, and the output terminal of which provides an ignition signal as an output therefrom;
- said ignition timing control circuit retaining the ignition timing in an advanced angle condition when the throttle switch closes the first contact and in a retarded angle condition when the throttle switch closes the second contact, and advancing the ignition timing corresponding to the revolutions of said engine when the first and second contacts of the throttle switch are both opened.

13. An ignition timing control apparatus as claimed in claim 12 wherein the non-inverting input terminal of said first comparator is applied with a constant voltage, and the non-inverting input terminal of said third comparator is supplied with the reference voltage changed by said throttle switch.

14. An ignition timing control apparatus as claimed in claim 12 wherein the non-inverting input terminal of said second comparator is supplied with the reference voltage changed by said throttle switch, and the non-inverting input terminal of said third comparator is supplied with a constant voltage.

15. An ignition timing control apparatus as claimed in claim 12 wherein the non-inverting input terminal of said first comparator is supplied with the reference voltage changed by said throttle switch, and the non-inverting input terminal of said third comparator is supplied with a constant voltage.

16. An ignition timing control apparatus comprising:
- an ignition power source for generating a reference voltage and providing power necessary for the ignition of said engine;
- a switching element for respectively connecting and disconnecting the power from said ignition power source to the ignition coil of said engine at a predetermined time;

signal generator means for generating signals for setting an ignition timing corresponding to the revolutions of said engine;

an ignition timing control circuit for computing ignition timing for said engine on the basis of the signals from said signal generator means and providing an ignition signal representing said ignition timing to said switching element; and a throttle switch interlocked with a throttle valve of said engine and having a movable contact in a closed position relative to a first contact when the throttle valve is fully opened and in a closed position relative to a second contact when the throttle is fully closed for changing said reference voltage according to the position of said throttle valve;

said ignition timing control circuit retaining the ignition timing in an advanced angle condition when the throttle switch closes the first contact and in a retarded angle condition when the throttle switch closes the second contact, and advancing the ignition timing corresponding to the revolutions of said engine when the first and second contacts of the throttle switch are both opened, said ignition timing control circuit comprising:

a first circuit for applying a retarding signal as a first ignition signal from one of the positive and negative signals from said signal generator means to said switching element;

a second circuit for calculating the ignition timing on the basis of an advancing signal from one of the positive and negative signals from said signal generator means and for generating a second ignition signal and an advance timing when said throttle switch closes said first contact, at a retarded timing when said throttle switch closes said second contact, or at a timing corresponding to the revolutions of said engine when said first and second contacts are both opened during mid-range engine speed; said second circuit comprising:

a switching device switching between conductive and non-conductive conditions according to the setting signal provided as an output from said signal generator means;

a flip-flop circuit, the output level of which is reversed by the conductive and non-conductive conditions of said switching element;

a first comparator, the inverting input terminal of which is connected to the output terminal of said flip-flop circuit;

a capacitor connected between the non-inverting input terminal and the output terminal of said first comparator;

a second comparator, the inverting input terminal of which is connected to the output terminal of said first comparator, the non-inverting input terminal of which is connected to receive said reference voltage changed according to the position of said throttle valve, and the output terminal of which is connected to an input of said flip-flop circuit; and a third comparator, the inverting input terminal of which is connected to the output terminal of said first comparator, the non-inverting terminal of which is connected to the output terminal of said flip-flop circuit, and the output terminal of which provides an ignition signal as an output therefrom; and a third circuit for generating a third ignition signal which is retarded behind said first ignition signal on the basis of an advancing signal from one of the positive and negative signals of said signal generator means and which is supplied to said switching element as the ignition signal representing the set ignition timing.

* * * * *